US 6,718,930 B2

(12) United States Patent
Ozeki (10) Patent No.: US 6,718,930 B2
(45) Date of Patent: Apr. 13, 2004

(54) INTAKE SYSTEM OF A V-TYPE ENGINE (75) Inventor: Hisashi Ozeki, Hamamatsy (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 10/176,339

(22) Filed: Jun. 20, 2002

(65) Prior Publication Data
US 2003/0015161 A1 Jan. 23, 2003

(30) Foreign Application Priority Data

Jul. 23, 2001 (JP) ....................................... 2001-221281
Jul. 25, 2001 (JP) ....................................... 2001-223963

(51) Int. Cl.[7] .............................................. F02M 35/10
(52) U.S. Cl. ............................... 123/184.55; 123/184.53
(58) Field of Search ..................... 123/184.21, 184.31, 123/184.34, 184.37, 184.53, 184.55

(56) References Cited

U.S. PATENT DOCUMENTS

| | | | | |
|---|---|---|---|---|
| 4,643,138 A | * | 2/1987 | Ruf et al. ............... | 123/184.34 |
| 4,784,091 A | | 11/1988 | Okada et al. .......... | 123/184.34 |
| 4,854,271 A | * | 8/1989 | Miyano et al. ........ | 123/184.31 |
| 5,005,536 A | * | 4/1991 | Suzuki et al. ......... | 123/184.35 |
| 5,056,473 A | * | 10/1991 | Asaki et al. ........... | 123/184.31 |
| 5,127,370 A | | 7/1992 | Suzuki et al. ......... | 123/184.35 |
| 5,657,727 A | * | 8/1997 | Uchida .................. | 123/184.34 |
| 5,715,781 A | * | 2/1998 | Martinelli ............. | 123/184.36 |
| 5,787,851 A | * | 8/1998 | Sakurai et al. ......... | 123/184.55 |
| 5,890,464 A | * | 4/1999 | Martinelli ............. | 123/184.36 |
| 5,901,677 A | * | 5/1999 | Ohrnberger et al. ... | 123/184.31 |
| 5,960,759 A | * | 10/1999 | Ohsuga et al. ......... | 123/184.31 |
| 6,055,958 A | | 5/2000 | Aoyama et al. ............ | 123/308 |
| 6,202,627 B1 | * | 3/2001 | Akima ........................ | 123/336 |
| 6,234,132 B1 | * | 5/2001 | Kopec et al. ........... | 123/184.34 |
| 6,260,528 B1 | * | 7/2001 | Pringle et al. ......... | 123/184.55 |
| 6,408,809 B2 | * | 6/2002 | Suzuki ................... | 123/184.31 |
| 2002/0170519 A1 | * | 11/2002 | Miyashita et al. ...... | 123/184.55 |

FOREIGN PATENT DOCUMENTS

| | | |
|---|---|---|
| JP | 59565 | 5/1982 |
| JP | 62237028 A2 | 10/1987 |
| JP | 63215822 A2 | 9/1988 |
| JP | 3271558 A2 | 12/1991 |
| JP | 7229424 A2 | 8/1995 |
| JP | 08319813 A2 | 12/1996 |
| JP | 11294171 A2 | 10/1999 |
| JP | 2000186640 A2 | 7/2000 |

* cited by examiner

Primary Examiner—Henry C. Yuen
Assistant Examiner—Hai Huynh
(74) Attorney, Agent, or Firm—Flynn, Thiel, Boutell & Tanis, P.C.

(57) ABSTRACT

A first intake pipe has one end connected to a second side of the surge tank which faces a second cylinder bank, and a second intake pipe has one end connected to a first side of the surge tank which faces a first cylinder bank. Adjacent the intake pipe ends, the first and second intake pipes are inversely bent near the second and first cylinder banks respectively, and have middle portions crossing below the surge tank and have other ends connected to the first and second cylinder banks. The first and second intake pipes are arranged in an alternating position in the cylinder-row direction. First and second branch pipes have upper ends connected into the surge tank and lower ends connected to adjacent other ends of the first and second intake pipes. Variable intake elements are disposed at the upper ends of the branch pipes to open and close.

7 Claims, 10 Drawing Sheets

DURING HIGH SPEED OPERATION

FIG. 13
PRIOR ART

DURING LOW SPEED OPERATION

INTAKE SYSTEM OF A V-TYPE ENGINE

FIELD OF THE INVENTION

This invention relates to an intake system of a V-type combustion engine, and more particularly to an intake system of a V-type engine which can reduce the height dimension thereof and which is advantageous in mounting on the vehicle.

This invention also relates to an intake system of a V-type engine in which intake passages for low speed and high speed operations are switched according to a driving state of a vehicle, and the intake passage for high speed is inclined toward a center of the V-bank so that the intake system is compactly disposed toward the cylinder banks.

BACKGROUND OF THE INVENTION

An engine may comprise, according to the arrangement of cylinders, an in-line engine having cylinder banks arranged in series, or a V-type engine having cylinder banks arranged in a V-shape. The V-type engine includes first and second cylinder heads on generally a V-shaped cylinder block. First and second head covers are mounted on the cylinder heads to define first and second cylinder banks arranged in a V-shape.

Figure 7:
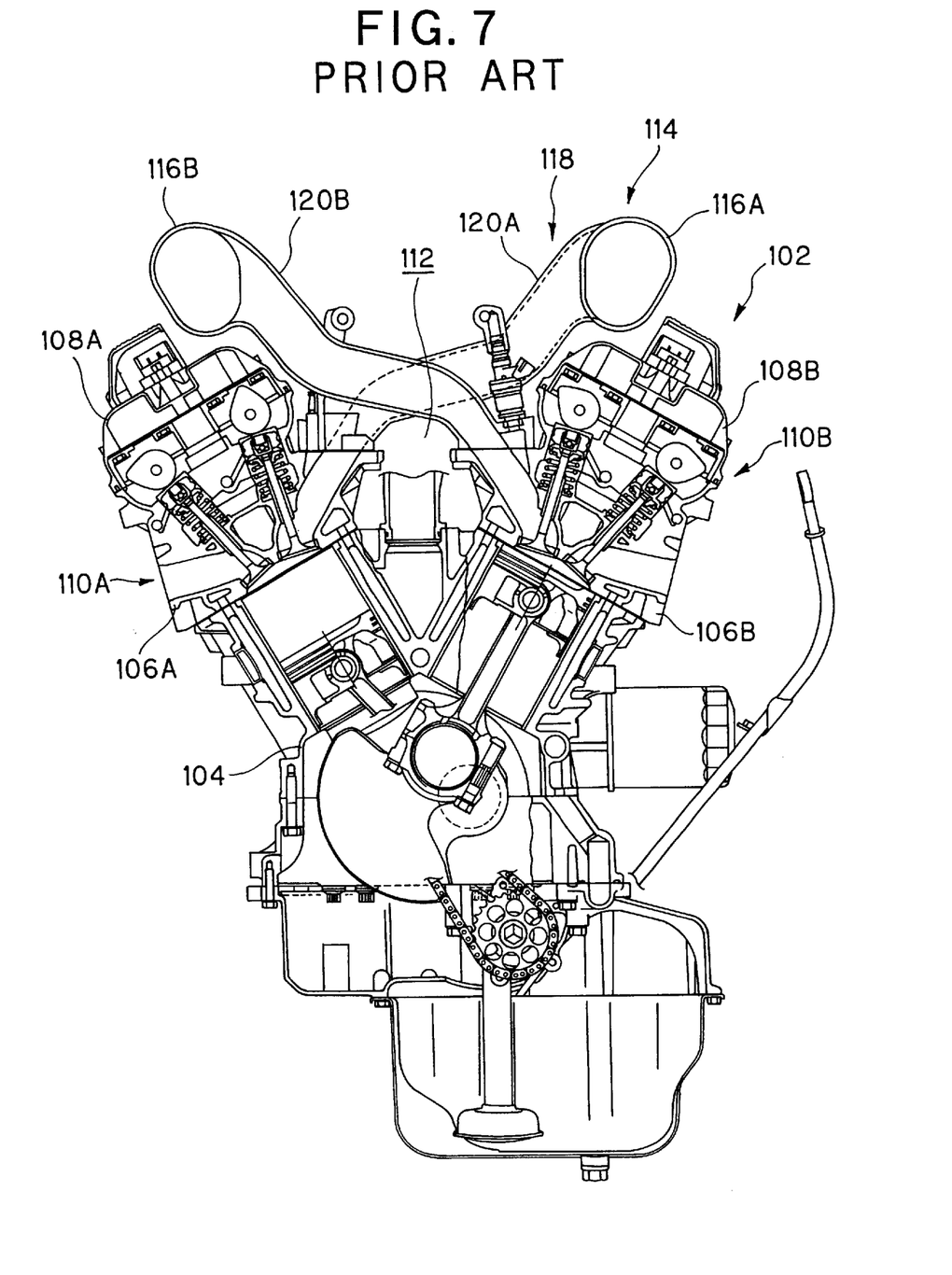
FIG. 7 is an enlarged cross-sectional view of the intake system according to the prior art.

A V-type engine 102 is shown in FIG. 7. The V-type engine 102 comprises first and second cylinder heads 106A, 106B on a generally V-shaped cylinder block 104, and first and second head covers 108A, 108B mounted on the cylinder heads 106A, 106B to define first and second cylinder banks 110A, 110B arranged in a V-shape. The cylinder banks 110A, 110B define a space 112 therebetween.

An intake system 114 of the V-type engine 102 comprises a first surge tank 116A above the cover 108B of the cylinder bank 110B, and a second surge tank 116B above the cover 108A of the cylinder bank 110A.

The surge tanks 116A, 116B are connected to one ends of respective first and second intake pipes 120A, 120B of an intake manifold 118. The intake pipes 120A, 120B extend from the respective surge tanks toward the opposite cylinder banks 110A, 110B, and have middle portions which intersect between the cylinder banks, and have the other ends thereof connected to the cylinder heads 106A, 106B of the cylinder banks 110A, 110B respectively.

The intake system 114 has a construction in which the first and second surge tanks 116A, 116B are disposed above the opposite second and first cylinder banks 110B, 110A, and the intake pipes 120A, 120B extend therefrom toward the opposite cylinder heads 106A, 106B. Accordingly, it is difficult to incorporate variable intake means which can change the intake pipe length.

An intake system of a V-type engine having variable intake means is disclosed in Japanese Patent No. 2541964, Japanese Patent Laid-Open No. 8-319813, and Japanese Patent Laid-Open No. 2000-186640.

The intake system disclosed in Japanese Patent No. 2541964 includes a volume above and between the banks, and first and second downstream intake passages connected to the banks and having downstream ends thereof intersecting below the volume. The intake passages are positioned in a cylinder-row direction in an alternating position. An intersection of the passages is positioned so as to be within the length of the volume in the cylinder-row direction. A first communication passage connects a lower part of the volume with the first intake passages. A second communication passage connects the lower part of the volume with the second intake passages. Valves are disposed in the communication passages and open the passages during high speed operation. The communication passages are arranged in two rows in the direction of the crankshaft axis.

The intake system disclosed in Japanese Patent Laid-Open No. 8-319813 comprises a plurality of branch pipes communicating to the opposing right and left banks formed in V-shape, a surge tank above the branch pipes to distribute intake air, a blowby gas passage to introduce blowby gas into the surge tank, an oil collect recess formed in a division wall dividing the surge tank and the branch pipes, and a hole for dropped oil connected to the oil collect recess and the branch pipes.

The intake system disclosed in Japanese Patent Laid-Open No. 2000-186640 has cylinders forming right and left banks arranged in V-shape or in horizontally opposed shape. Valves for opening and shutting main passages are positioned by one single shaft at the intersection of two main passages to the cylinders of the right and left banks. Sub passages have one ends opened toward the upstream side of the valve, and the other ends opened toward the downstream side thereof.

The intake system of the V-type engine disclosed in, e.g., Japanese Patent No. 2541964 includes a surge tank as a volume part above a space between first and second banks. An intersection or crossing of first and second downstream intake passages is positioned below the surge tank. First and second communication passages communicate a lower part of the surge tank with the intake passages. Valves are arranged in the passages to open and close the passage to vary the length of the intake passages.

However, in these intake systems, the crossing of the intake passages, the communication passages, and the valves are stacked in a vertical direction below the surge tank, causing the surge tank to protrude significantly above this space. As a result, the height dimension of the engine becomes large, which is disadvantageous when the engine is mounted to the vehicle.

In order to obviate or minimize the above problem or expense, the present invention provides an intake system of a V-type engine having a surge tank extending in a cylinder-row direction above a space between first and second cylinder banks of the V-type engine, a first intake pipe of a intake manifold having one end thereof connected to a second side of the surge tank which faces the second cylinder bank, and a second intake pipe of a intake manifold having one end thereof connected to a first side of the surge tank which faces the first cylinder bank, the first and second intake pipes having one ends thereof bent and turned in the vicinities of the second and first cylinder banks respectively, and having middle portions thereof intersected below the surge tank to have the other ends thereof connected to the first and second cylinder banks, the intake system comprising: the first and second intake pipes which are connected to the first and second cylinder banks respectively arranged in an alternating position in a cylinder-row direction; first and second branch pipes having one ends thereof connected into the surge tank and the other ends thereof connected to adjacent other ends of the first and second intake pipes; and variable intake means (e.g. valve elements) to open and close first and second branch passages of the branch pipes, the variable intake means being disposed at one ends of the first and second branch pipes which are inserted into the surge tank.

Such an intake system minimizes protrusion of the surge tank from the space between the cylinder banks since the variable intake means are disposed within the surge tank, whereas the variable intake means of a conventional intake system are disposed below the surge tank.

An intake system of a V-type engine is also disclosed in Japanese Patent Laid-Open No. 3-271558 and has primary and secondary ports opening toward a V-shaped space in the multi-cylinder V-type engine. The ports are connected to a surge tank within the V-shaped space through primary and secondary intake passages, respectively. A control-valve is provided in the secondary port to close and open at low and high engine speeds, respectively. The secondary intake passage extends upwardly from a cylinder in a slanting direction. The primary intake passage extends upwardly to detour the rotating shaft line of the control-valve. Thereby, a compact engine constitution is achieved.

Another intake system of an engine as disclosed in Japanese Patent Laid-Open No. 7-229424 has an intake air control valve for variable control of an intake passage area disposed within an intake passage connecting to a plurality of intake valve openings. The intake passage is divided into first and second passages. The second passage communicates with a part of the intake valve opening by a separate wall. The first passage communicates with the other intake valve opening. A second control valve controls the second passage to be fully closed when the quantity of intake air is small, and to be fully opened when the quantity of intake air is large. A first control valve controls the first passage to be closed such that only upward or outward portion thereof is opened when the quantity of intake air is small, and to be fully opened when the quantity of the intake air is large. This constitution, without an increased intake resistance, produces tumble or swirl flow reliably.

Figure 12:
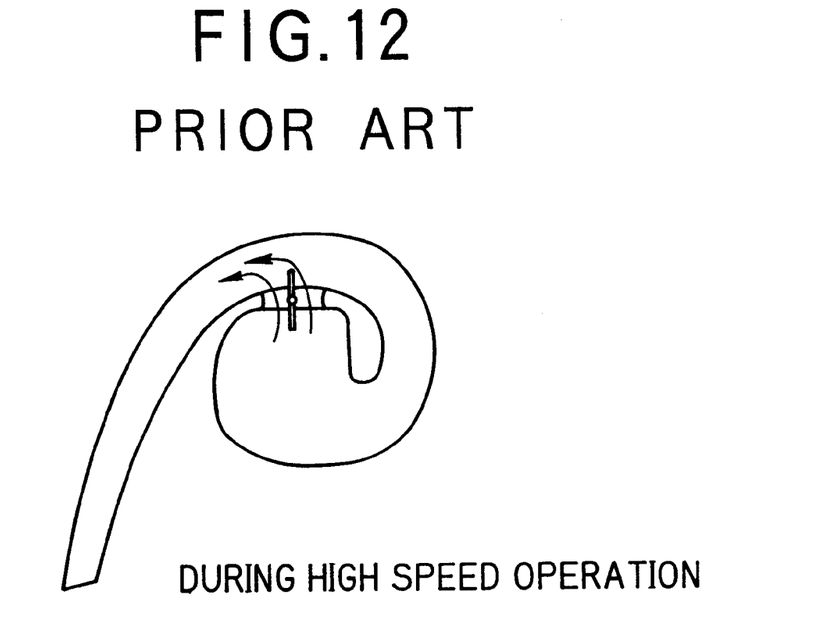
FIG. 12 is a schematic view of a prior art intake system during high speed operation.
Figure 13:
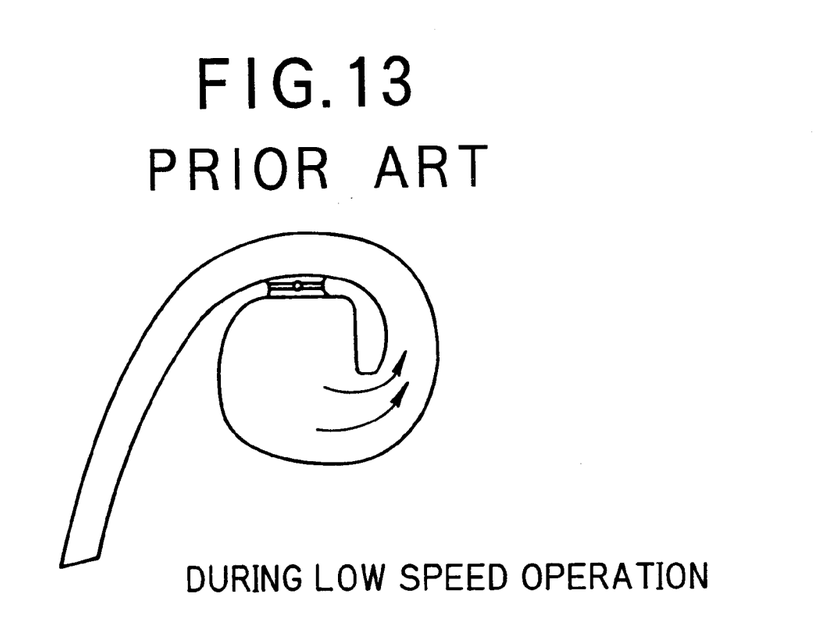
FIG. 13 is a schematic view of the prior art intake system during low speed operation.

An intake system of a conventional V-type engine having a variable intake valve system, as shown in FIGS. 12 and 13, has been already provided commercially. Such a valve system comprises a surge tank, an intake manifold rolling around the surge tank in a counter clockwise direction, and a variable intake valve unit disposed between an upper part of the surge tank and the intake manifold. The variable intake valve of the variable intake valve unit is switched. That is, the variable intake valve is opened during high-speed operation as shown in FIG. 12, and is closed during low-speed operation as shown in FIG. 13. However, the flow out from the variable intake valve during high-speed operation is bent (i.e. curved) to a large degree, causing an increase in intake resistance and reducing output.

In order to obviate or at least minimize the above inconveniences, the present invention provides an intake system of a V-type engine having a surge tank disposed above and between first and second cylinder banks of the V-type engine, intake passages branching from sides of the surge tank and each intersecting below the surge tank to connect to each cylinder bank, the intake system comprising: first and second intake passages connected to the first and second cylinder banks respectively, and disposed below the surge tank in a cylinder-row direction; first and second branch passages branching from middle portions of the first and second intake passages respectively, and connected to a lower part of the surge tank, the first and second branch passage having center axes thereof inclined toward a center axis of the cylinder banks of the V-type engine, the two center axes intersecting within the surge tank; and a valve system to open and close the first and second branch passages, the valve system having a rotating shaft thereof penetrating at an intersection of the two center axes.

According to the present invention, the first and second branch passages for high speed operation are thus inclined toward the center axis between the cylinder banks which is a longitudinal center axis of the V-type engine. Accordingly, bending with the intake ports of the first and second cylinder heads having openings toward the center axis of the V-bank is prevented, so that the resistance of intake can be reduced. Also, an intersection of the first and second branch passages is positioned within the surge tank, so that the surge tank can be disposed at a lower position, which can reduce the height dimension of the intake system. Furthermore, the intersecting part can be penetrated by one single rotating shaft of the valve system for opening and closing of the first and second branch passages. Thereby, the surge tank having the valve system built-in can be miniaturized, which can reduce width dimension of the intake system.

DETAILED DESCRIPTION

Figure 2:
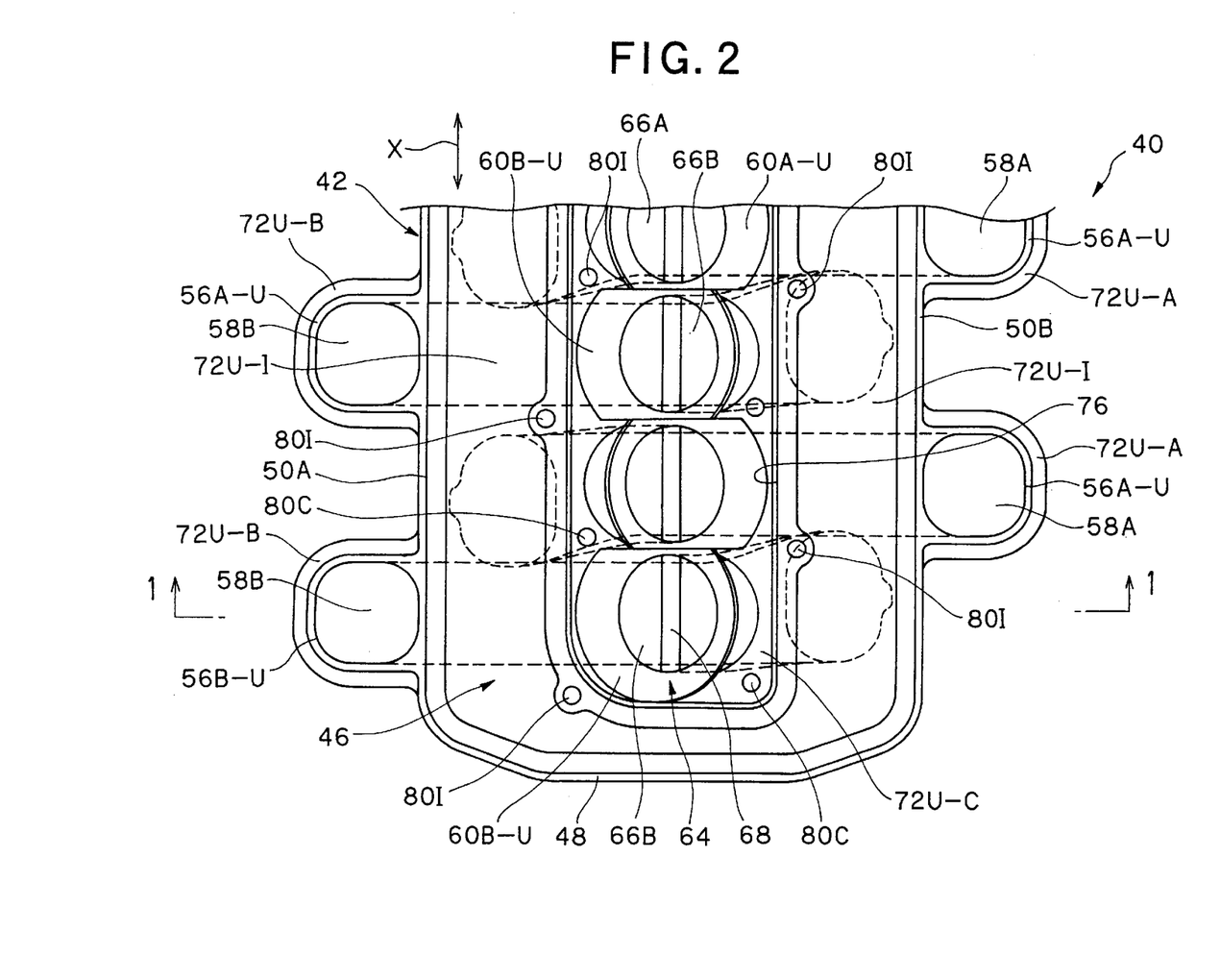
FIG. 2 is an enlarged cross-sectional view taken along line 2—2 in FIG. 4.
Figure 3:
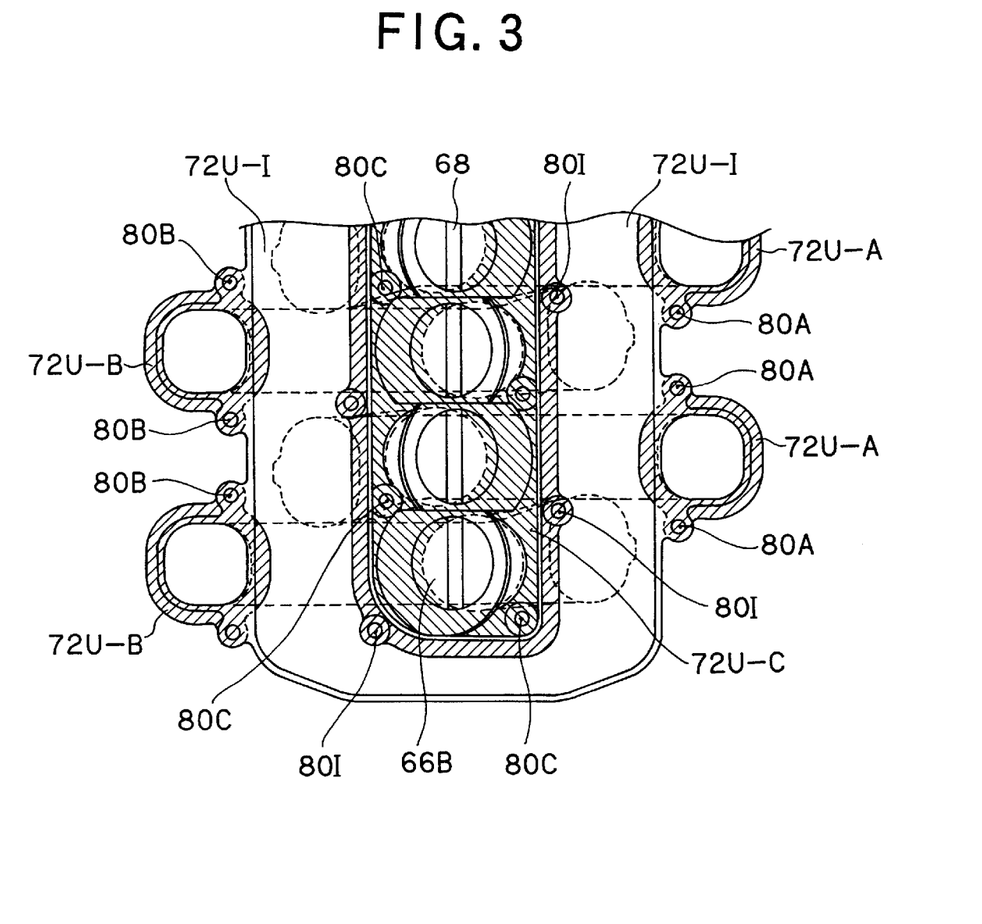
FIG. 3 is a diagram illustrating a seal between upper and lower blocks.
Figure 4:
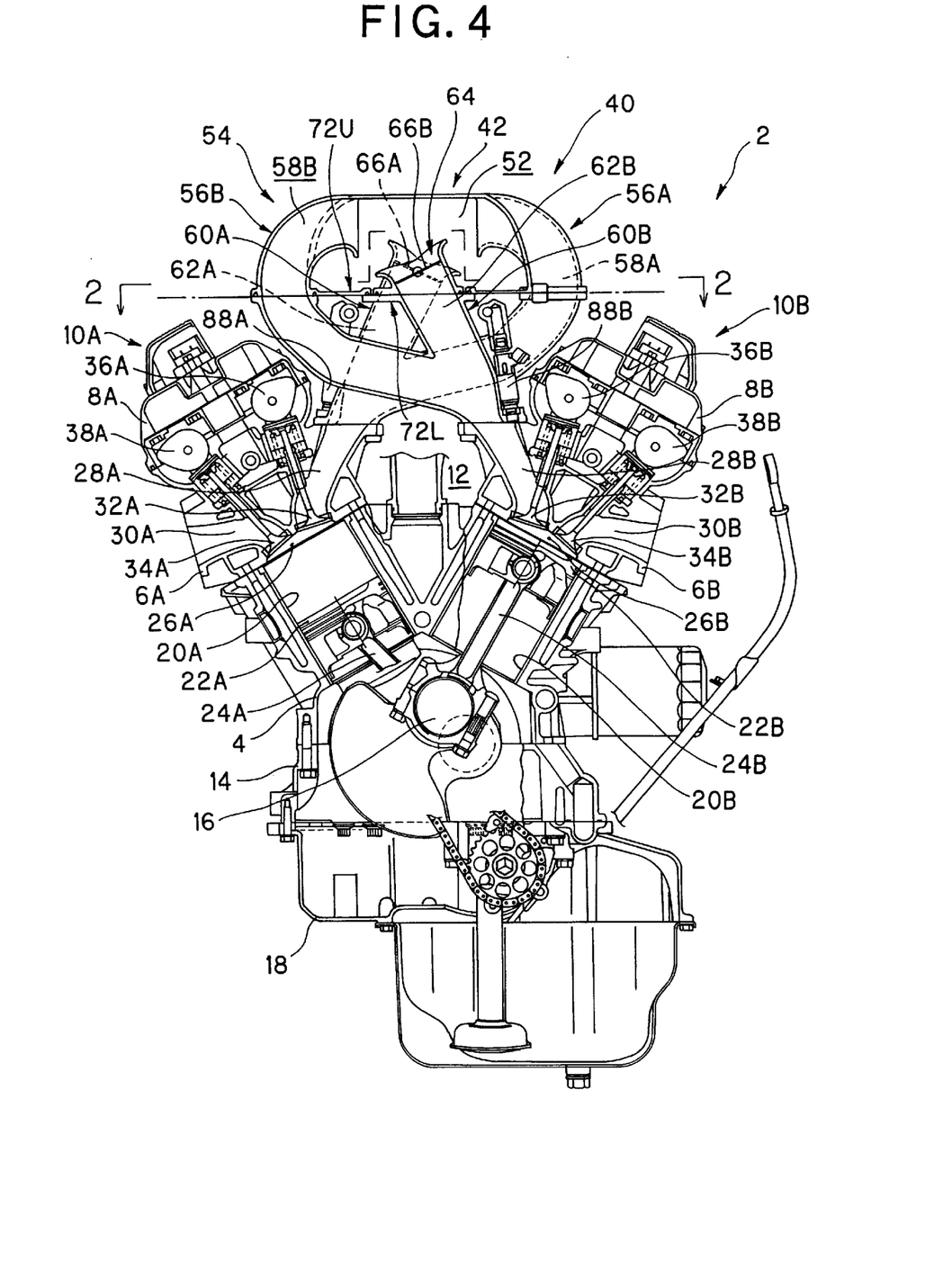
FIG. 4 is a cross-sectional view of the intake system of the V-type engine.

The present invention will now be described in detail with reference to FIGS. 1–4, which illustrate a first embodiment of the invention. Referring to FIG. 4, a V-type engine 2 includes first and second cylinder heads 6A, 6B on a generally V-shaped cylinder block 4, and first and second cylinder head covers 8A, 8B on the cylinder heads 6A, 6B to define first and second cylinder banks 10A, 10B arranged in a V-shape. The cylinder banks 10A, 10B define therebetween a V-shaped space 12 which, in the illustrated arrangement, opens outwardly away from the engine.

The V-type engine 2 has a bearing cap 14 at a lower part of the cylinder block 4 to support a crankshaft 16. An oil pan 18 is arranged below the bearing cap 14. The cylinder block 4 includes first and second cylinders 20A, 20B and slidable first and second pistons 22A, 22B. The pistons 22A, 22B are connected to the crankshaft 16 through first and second connecting rods 24A, 24B. Incidentally, this V-type engine 2 has plural e.g. three cylinders 20A in series in the first cylinder bank 10A of the cylinder block 4, and plural e.g. three cylinders 20B in series in the second cylinder bank 10B.

The cylinder heads 6A, 6B have spaces 26A, 26B for first and second combustion chambers corresponding to the cylinders 20A, 20B. The spaces 26A, 26B are connected with first and second intake ports 28A, 28B along with first and second exhaust ports 30A, 30B.

The intake ports 28A, 28B have upstream ends thereof opened toward the space 12, whereas the exhaust ports 30A, 30B have downstream ends thereof opened outwardly of the V-type engine 2 away from the space 12. The cylinder heads 6A, 6B include first and second intake valves 32A, 32B, first and second exhaust valves 34A, 34B, first and second intake camshafts 36A, 36B, and first and second exhaust camshafts 38A, 38B. The intake and exhaust valves 32, 34 open/close the intake and exhaust ports 28, 30 respectively. The intake and exhaust camshafts 36, 38 are rotatably supported and drive to open/close the intake and exhaust valves 32, 34 respectively, in a conventional manner.

Figure 1:
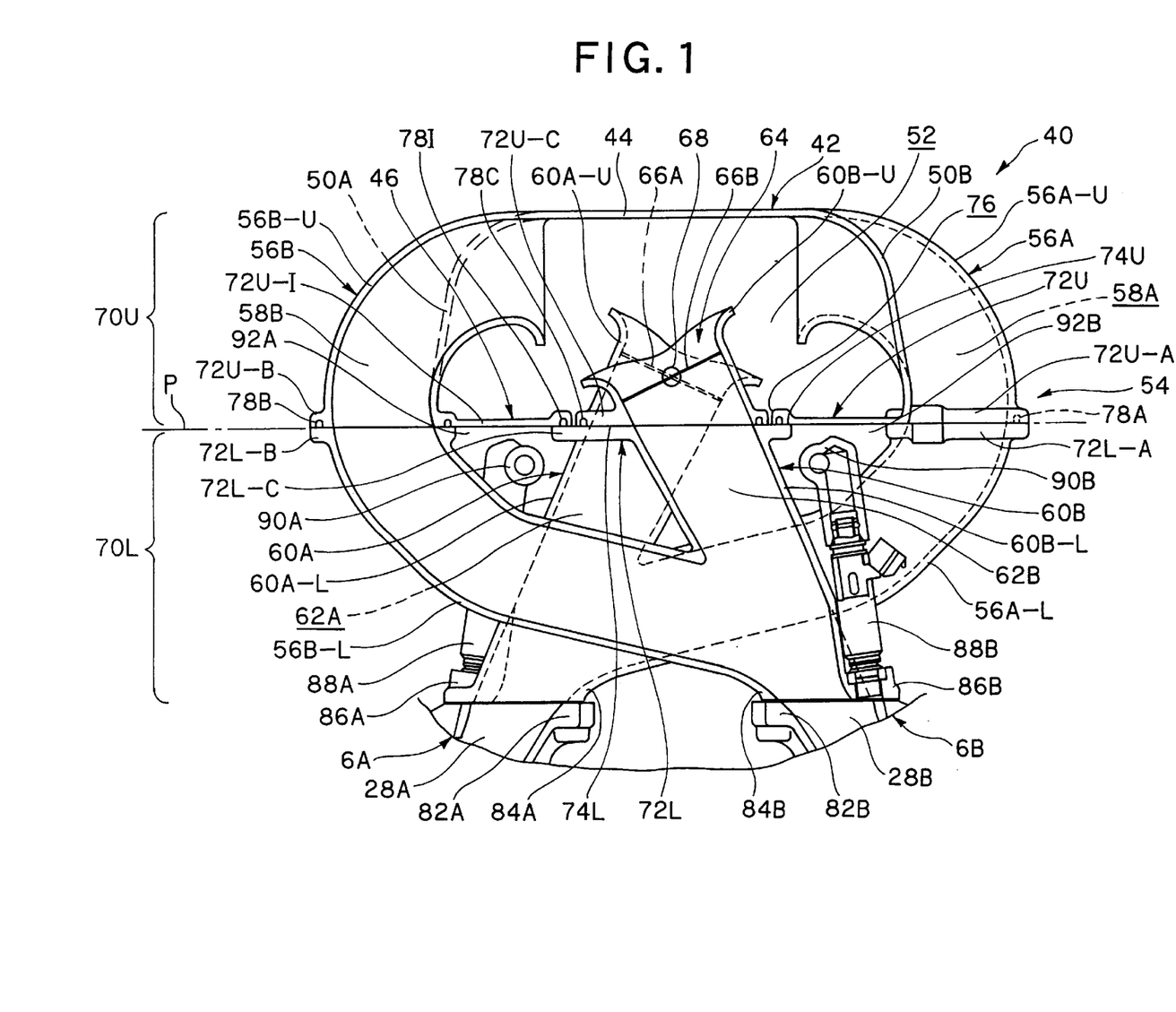
FIG. 1 is an enlarged cross-sectional view of an intake system of a V-type engine of a first embodiment taken along line 1—1 in FIG. 2.

An intake system 40 of the V-type engine 2 includes an elongated surge tank 42 extending in a cylinder-row direction "X" (i.e., in the elongated direction of the cylinder banks), which direction "X" is parallel with the crankshaft axis, and is disposed above the space 12 between the cylinder banks 10A, 10B. As shown in FIGS. 1 and 2, the surge tank 42 includes a tank passage 52 extending in the cylinder-row direction "X". The tank passage 52 as it extends in the cylinder-row direction "X" is defined by upper and lower walls 44, 46, end walls 48, 48 which are spaced apart in the direction "X", and first and second side walls 50A, 50B positioned closest to the cylinder banks 10A, 10B, respectively. The tank passage 52 has an upstream side thereof connected to an air cleaner through a throttle body by an intake duct (not shown).

The surge tank 42 is connected to first and second intake pipes 56A, 56B of the intake manifold 54 for a low speed operation. The intake manifold 54 is connected, on the second side wall 50B facing the cylinder bank 10B, to one end of the intake pipe 56A, and is connected, on the first side wall 50A facing the cylinder bank 10A, to one end of the intake pipe 56B. The intake pipes 56A, 56B thus have the one ends thereof connected into the tank passage 52 from the sides 50B, 50A of the surge tank 42.

Referring to FIG. 4, the first and second intake passages 56A, 56B have the one ends thereof bent and turned in the vicinities of the second and first head covers 8B, 8A of the cylinder banks 10B, 10A respectively. The intake pipes 56A, 56B have middle portions thereof which cross (i.e. intersect when viewed in the X direction) at a location below the surge tank 42, and the other ends thereof connect to the cylinder heads 6A, 6B of the cylinder banks 10A, 10B.

In the V-type engine 2 of this embodiment, three first intake pipes 56A (one for each cylinder) have one ends thereof connected to the second side wall 50B of the surge tank 42, and the other ends thereof connected to the cylinder head 6A. Also, three second intake pipes 56B (one for each cylinder) have one ends thereof connected to the first side wall 50A of the surge tank 42, and the other ends thereof connected to the cylinder head 6B. The intake pipes 56A, 56B which are respectively connected to the cylinder banks 10A, 10B are arranged in an alternating position in the cylinder-row direction "X".

The intake pipes 56A, 56B define therein first and second intake passages 58A, 58B which have one ends thereof connected to the tank passage 52 and the other ends thereof connected to the intake ports 28A, 28B.

The intake manifold 54 has first and second branch pipes 60A, 60B for a high speed operation which shorteningly connect the surge tank 42 with the intake pipes 56A, 56B. The branch pipes 60A, 60B have one ends thereof inserted into the tank passage 52 from a lower flange or wall 46 of the surge tank 42, and the other ends thereof connected to the intake pipes 56A, 56B in the vicinity of the other ends thereof.

The V-type engine 2 has four first branch pipes 60A and four second branch pipes 60B. The branch pipes 60A, 60B are arranged in an alternating position in a direction "X" and have the one ends thereof aligned in the direction "X". The branch pipes 60A, 60B have first and second branch passages 62A, 62B therein. The branch passages 62A, 62B have one ends thereof connected to the tank passage 52 and the other ends thereof connected to the intake passages 58A, 58B. As shown by axes C2 and C1 in FIG. 8, the branch passages 62A, 62B are generally aligned with the intake ports 122-2, 122-1, respectively.

The branch pipes 60A, 60B which are inserted into the surge tank 42 have at one ends thereof variable intake means or elements 64 which open and close the branch passages 62A, 62B of the branch pipes 60A, 60B. The variable intake means 64 has first and second valves 66A, 66B in the branch passages 62A, 62B of the branch pipes 60A, 60B in the tank passage 52. The valves 66A, 66B comprise three valves 66A and three valves 66B.

The valves 66A, 66B are attached to one single valve shaft 68 which extends in the "X" direction and which penetrates the branch passages 62A, 62B and is supported by the branch pipes 60A, 60B in the tank passage 52. These valves 66A, 66B are driven by a valve drive system (not shown) to open and close the branch passages 62A, 62B according to an operating state of the V-type engine 2.

The intake pipes 56A, 56B and the branch pipes 60A, 60B are divided into an upper block member 70U toward the surge tank 42 and a lower block member 70L toward the cylinder banks 10A, 10B by a dividing surface or plane "P" which substantially aligns with the lower side wall 46 of the surge tank 42.

The upper block 70U comprises the surge tank 42 along with first and second upper intake pipe parts 56A-U, 56B-U, and first and second upper branch pipe parts 60A-U, 60B-U. The upper intake pipe parts 56A-U, 56B-U are connected to the first and second side walls 50A, 50B of the surge tank 42. The upper branch pipe parts 60A-U, 60B-U are inserted into the surge tank 42 through the wall 46. Also, the lower block 70L comprises first and second lower intake pipe parts 56A-L, 56B-L, and first and second lower branch pipe parts 60A-L, 60B-L. The lower intake pipe parts 56A-L, 56B-L are connected to the cylinder banks 10A, 10B, and to the lower branch pipe parts 60A-L, 60B-L Thereby, the intake pipes 56A, 56B are divided into the upper intake pipe parts 56A-U, 56B-U and the lower intake pipe parts 56A-L, 56B-L by the dividing surface "P". Similarly, the branch pipes 60A, 60B are divided into the upper branch pipe parts 60A-U, 60B-U and the lower branch pipe parts 60A-L, 60B-L by the dividing surface "P".

The upper and lower blocks 70U, 70L have upper and lower divided surfaces 72U, 72L respectively. The upper and lower divided surfaces 72U, 72L have upper and lower divided surfaces 74U, 74L on the dividing surface "P" respectively.

The upper divided surface 72U includes upper center-divided surface 72U-C, upper inner-divided surface 72U-I, and first and second upper divided surfaces 72U-A, 72-B.

The upper center-divided surface 72U-C forms a part of a lower surface 46. The upper inner-divided surface 72U-I forms the other remaining part of a lower surface 46 so as to surround the upper center-divided surface 72U-C. The first and second upper divided surfaces 72U-A, 72U-B project toward the second and first cylinder banks 10B, 10A from the side walls 50A, 50B of the surge tank 42.

The upper center-divided surface 72U-C includes the opened upper branch pipes 60A-U, 60B-U having therein the variable intake means 64. Also, the upper inner-divided surface 72U-I includes an opening 76 into which the upper branch pipe parts 60A-U, 60B-U having the variable intake means 64 are inserted. The opening 76 is provided with the upper center-divided surface 72U-C. Further, the upper divided surfaces 72U-A, 72U-B include the intake pipe parts 56A-U, 56B-U having one ends opened.

The lower divided surface 72L includes lower center-divided surface 72L-C, and first and second lower divided surfaces 72L-A, 72L-B. The lower center-divided surface 72L-C abuts on the upper center-dividing part 72U-C and the upper inner-dividing part 72U-I. The first and second lower divided surfaces 72L-A, 72L-B abut on the respective upper divided surfaces 72U-A, 72U-B.

The lower center-divided surface 72L-C includes the lower branch pipe parts 60A-L, 60B-L having one end opened. The lower divided surfaces 72L-A, 72L-B include the lower intake pipe parts 56A-L, 56B-L having one ends opened.

The upper center-divided surface 72U-C surrounding the upper branch pipe parts 60A-U, 60B-U includes a center seal part 78C. The center seal part 78C seals the lower center-divided surface 72L-C surrounding the lower branch pipe parts 60A-L, 60B-L. Also, the upper inner-divided surface 72U-I around the opening 76 includes an inner seal part 78I. The inner seal part 78I seals the lower center-divided surface 72L-C around the lower branch pipe parts 60A-L, 60B-L. Further, the upper divided surfaces 72U-A, 72U-B include first and second seal parts 78A, 78B. The seal parts 78A, 78B seal the lower divided surface 72L-A, 72L-B around the lower intake pipe parts 56A-L, 56B-L.

Referring to FIG. 2, in the intake system 40, the branch pipe parts 60A-U, 60B-U, including the valves 66A, 66B, are attached above the lower divided surface 74L of the lower center-divided surface 72L-C. This attachment is done by threadedly attaching a center mounting bolt (not shown), which is threadingly inserted into an upper center-mounting hole 80C in the upper center-divided surface 72U-C, into a lower center hole (not shown) in the lower center-divided surface 72L-C. The center seal part 78C seals the branch passages 62A, 62B between the upper and lower center-divided surfaces 72U-C, 72L-C.

Also, in the intake system 40, the surge tank 42 is attached above the lower divided surface 74L of the lower center-divided surface 72L-C. This attachment is done by threadedly attaching an inner mounting bolt (not shown), which is threadingly inserted into an upper inner-mounting hole 80C in the upper inner-divided surface 72U-I, into a lower inner hole (not shown) in the lower center-divided surface 72L-C. The opening 76 between the upper inner-divided surface 72U-I and the lower center-divided surface 72L-C is sealed with the inner seal part 78I.

Furthermore, in the intake system 40 the upper branch pipe parts 60A-U, 60B-U are attached above the lower divided surface 74L of the lower divided surfaces 72L-A, 72L-B. This attachment is done by threadedly attaching first and second mounting bolts (not shown), which are threadingly inserted into first and second upper mounting holes 80A, 80B in the upper divided surfaces 72U-I, into first and second lower holes (not shown) in the lower divided surfaces 72L-A, 72L-B. The intake passages 58A, 58B between the upper divided surfaces 72U-A, 72U-B and the lower divided surfaces 72L-A, 72L-B are sealed with the seal parts 78A, 78B.

The intake system 40 of the engine 2 is provided with first and second mounting flanges 82A, 82B (FIG. 1) toward the space 12 of the cylinder heads 6A, 6B. The flanges 82A, 82B are opened toward the upstream sides of the intake ports 28A, 28B. The lower intake pipe parts 56A-L, 56B-L of the intake manifold 54 have at the other ends thereof first and second intake pipe side mounting flanges 84A, 84B which are connected to the flanges 82A, 82B.

The intake manifold 54 has the mounting flanges 84A, 84B of the lower intake pipe parts 56A-L, 56B-L attached to the mounting flanges 82A, 82B of the cylinder heads 6A, 6B by flange mounting bolts (not shown).

In addition, the intake manifold 54 has first and second injection valve mounting parts 86A, 86B attached to mounting flanges 84A, 84B of the lower intake pipe parts 56A-L, 56B-L. The injection valve mounting parts 86A, 86B include first and second fuel injection valves 88A, 88B which have one ends thereof oriented toward first and second cylinders 18A, 18B. The fuel injection valves 88A, 88B include three first injection valves 88A, and three second injection valves 88B.

The injection valves 88A, 88B have one basis ends thereof connected to first and second delivery pipes 90A, 90B respectively. The delivery pipes 90A, 90B are disposed in first and second spaces 92-A, 92B between the lower intake pipe parts 56A-L, 56B-L and the lower branch pipe parts 60A-L, 60B-L in the cylinder-row direction. The fuel injection valves 88A, 88B are supplied with distributed fuel through the delivery pipes 90A, 90B.

Next, the operation of the above embodiment will be briefly described.

The intake system 40 of the V-type engine 2 includes the surge tank 42 extending in the cylinder-row direction "X" and disposed above the space 12 between the cylinder banks 10A, 10B. The second side wall 50B of the surge tank 42 facing toward the second cylinder bank 10B is connected to one end of the intake pipe 56A of the intake manifold 54, and the first side wall 50A thereof facing toward the first cylinder bank 10A is connected to one end of the intake pipe 56B of the intake manifold 54 The first and second intake pipes 56A, 56B are adjacent one ends thereof bent and turned in the vicinities of the second and first cylinder banks 10B, 10A, and have middle portions thereof intersected in the space 12 below the surge tank 42, and have the other ends thereof connected to the first and second cylinder heads 6A, 6B of the cylinder banks 10A, 10B respectively.

The intake system 40 includes the intake pipes 56A, 56B, which are connected to the cylinder banks 10A, 10B, positioned in an alternating position in the cylinder-row direction "X". Also, the intake system 40 includes the branch pipes 60A, 60B which have one ends thereof inserted into the surge tank 42 and connected thereto, and the other ends thereof connected adjacent one ends of the intake pipes 56A, 56B. The branch pipes 60A, 60B which are inserted into the surge tank 42 have at one ends thereof variable intake means 64 which open and close the branch passages 62A, 62B of the branch pipes 60A, 60B according to an operating state of the V-type engine 2.

As thus described, this intake system 40 of the present invention does not have the variable intake means disposed below the surge tank 40, but disposed within the surge tank 42 such that the surge tank 42 does not protrude toward or into the space 12.

Accordingly, the intake system 40 of the V-type engine 2 has a smaller height dimension and can be made compactly, so that it is advantageous to mount to the engine.

Also, in the intake system 40, the intake pipes 56A, 56B and the branch pipes 60A, 60B are divided into the upper block 70U toward the surge tank 42 and the lower block 70L toward the cylinder banks 10A, 10B by the dividing surface "P" in line with the lower wall of the surge tank 42. Thereby, the upper block 70U can be formed of the upper intake pipe parts 56A-U, 56B-U and the upper branch pipe parts 60A-U, 60B-U. The lower block 70U can be formed of the lower intake pipe parts 56A-L, 56B-L and the lower branch pipe parts 60A-L, 60B-L.

The intake system 40 has upper and lower divided surfaces 72U, 72L in the upper and lower blocks 70U, 70L respectively. The upper branch pipe parts 60A-U, 60B-U, which are one ends of the branch pipes 60A, 60B and which have the variable intake means 64, are disposed above the lower divided surface 74L of the lower divided surface 72L.

As thus described, in the intake system 40, the lower divided surfaces 72L-A, 72L-B (of the lower intake pipe parts 56A-L, 56B-L to which the upper intake pipe parts 56A-U, 56B-U are attached) and the lower center-divided surface 72L-C (of the lower branch pipes 60A-L, 60B-L to which the upper branch pipe parts 60A-U, 60B-U having the variable intake means 64 are attached) are positioned at the same level as the dividing surface "P". Accordingly, the process for joining to the lower divided surface 74L is made easier.

Furthermore, the intake system 40 has in the upper inner-divided surface 72U-I the opening 74 into which the upper branch pipe parts 60A-U, 60B-U having the variable intake means 64 are inserted to position within the surge tank 42. The upper inner-divided surface 72U-I around the opening 74 has the center seal part 78C to seal the lower center-divided surface 72L-C around the lower branch pipe parts 60A-L, 60B-L.

As thus described, in the intake system 40, the opening 76, which is formed at the upper inner-divided surface 72U-I in the upper block 70U, and into which the upper branch pipe parts 60A-U, 60B-U are inserted to position within the surge tank 42, can be sealed by the lower center-divided surface 72L-C around the lower branch pipe parts 60A-L, 60B-L. Accordingly, the gap between the upper and lower blocks 70U, 70L can be sealed at the dividing surface "P" at the same level, thereby achieving easier measurement.

Figure 5:
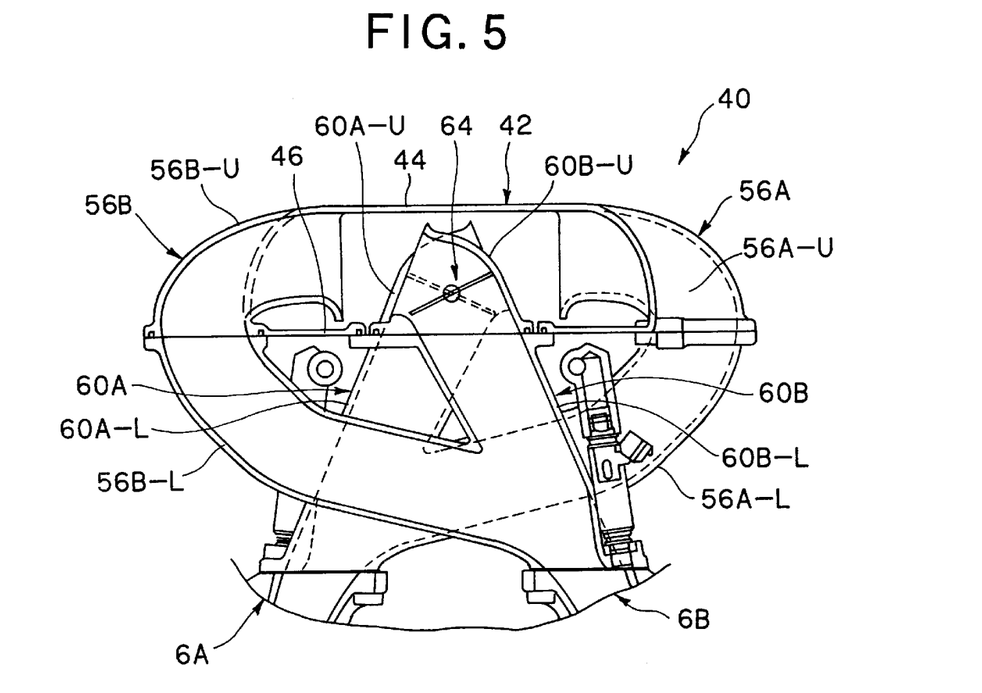
FIG. 5 is an enlarged cross-sectional view of the intake system according to a second embodiment.

FIG. 5 illustrates a second embodiment of the present invention. In the intake system 40 of the second embodiment, the first and second branch pipes 60A, 60B of the intake manifold 54 which is inserted into the surge tank 42, have one ends thereof bent and turned toward the second and first side walls 50B, 50A in the surge tank 42, respectively. The intake pipes 56A, 56B of the intake manifold 54 have adjacent one ends thereof bent toward the surge tank to a large degree. The large bent first and second intake pipes 56A, 56B for low speed operation have one ends thereof disposed such that the pipes 56A, 56B are inserted into the tank passage 52 from the second and first side walls 50B, 50A of the surge tank 42 so as to be positioned close to the lower surface 46.

In the intake system 40 according to the second embodiment, the branch pipes 60A, 60B have one ends thereof bent and opened toward the side walls 50B, 50A within the surge tank 42, and the intake pipes 56A, 56B adjacent one ends thereof are bent to a large degree so as to be disposed adjacently and below the surge tank 42. Accordingly, the surge tank 42 can have upper surface 44 closer to the lower surface 46 than that of the first embodiment.

Thereby, the surge tank 42 of the intake system 40 can have smaller height dimension so as to be compact, which is advantageous to mount to the engine of the vehicle.

Figure 6:
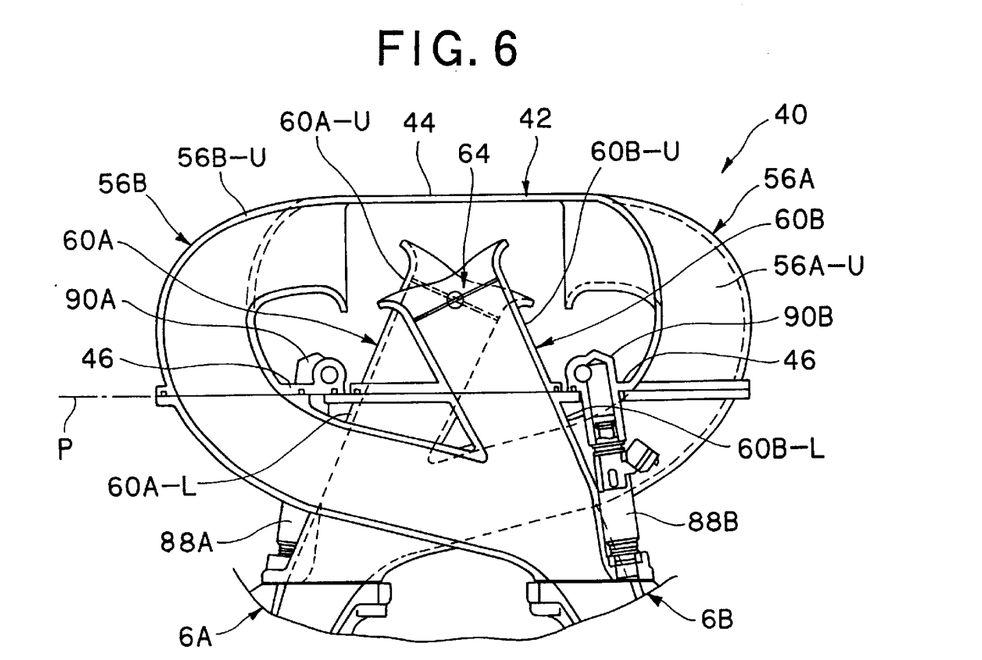
FIG. 6 is an enlarged cross-sectional view of the intake system according to a third embodiment.

FIG. 6 illustrates a third embodiment of the present invention. In the intake system of the third embodiment, the dividing surface "P" which divides the intake pipes 56A, 56B, and the branch pipes 60A, 60B of the intake manifold 54 into upper and lower parts, is arranged at a lower position where the delivery pipes 90A, 90B cross. The surge tank 42 has the lower wall 46 at the same level as the dividing surface "P". The delivery pipes 90A, 90B can be formed integrally with the lower surface 46.

According to the third embodiment, the surge tank 42 has the lower part 46 positioned at the same level with the dividing surface "P" which is set at a position where the delivery pipes 90A, 90B cross. Accordingly, the surge tank 42 can have the upper surface 44 closer to the lower wall 46. Also, the delivery pipes 90A, 90B are formed integrally with the lower surface 46, so that separate mounting of the delivery pipes is unnecessary.

Thereby, the surge tank 42 of the intake system 40 can have smaller height dimension and is made compactly, which is advantageous to mount to the engine of the vehicle. Also, the number of assembling process steps of the delivery pipes 90A, 90B can be reduced, which can reduce cost.

As described above, in the intake system of the V-type engine according to the present invention, the variable intake means are not disposed below the surge tank such as in the prior art, but rather are disposed within the surge tank, so that the surge tank does not protrude toward the space between the cylinder banks. Accordingly, the intake system reduces the height dimension of the engine and allows for a compact arrangement.

Other embodiments of the present invention will now be described with reference to FIGS. 8–11.

Figure 8:
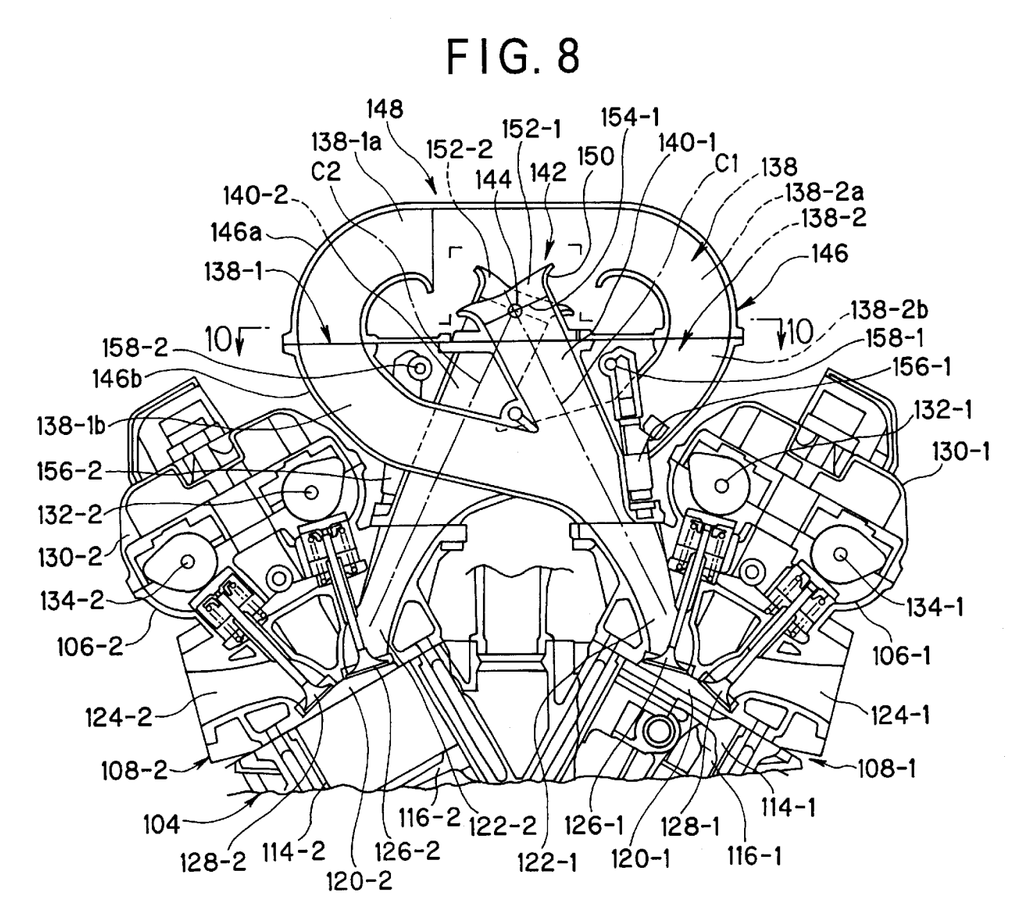
FIG. 8 is a schematic enlarged cross-sectional front view of an intake system of a V-type engine according to a fourth embodiment of the invention.
Figure 9:
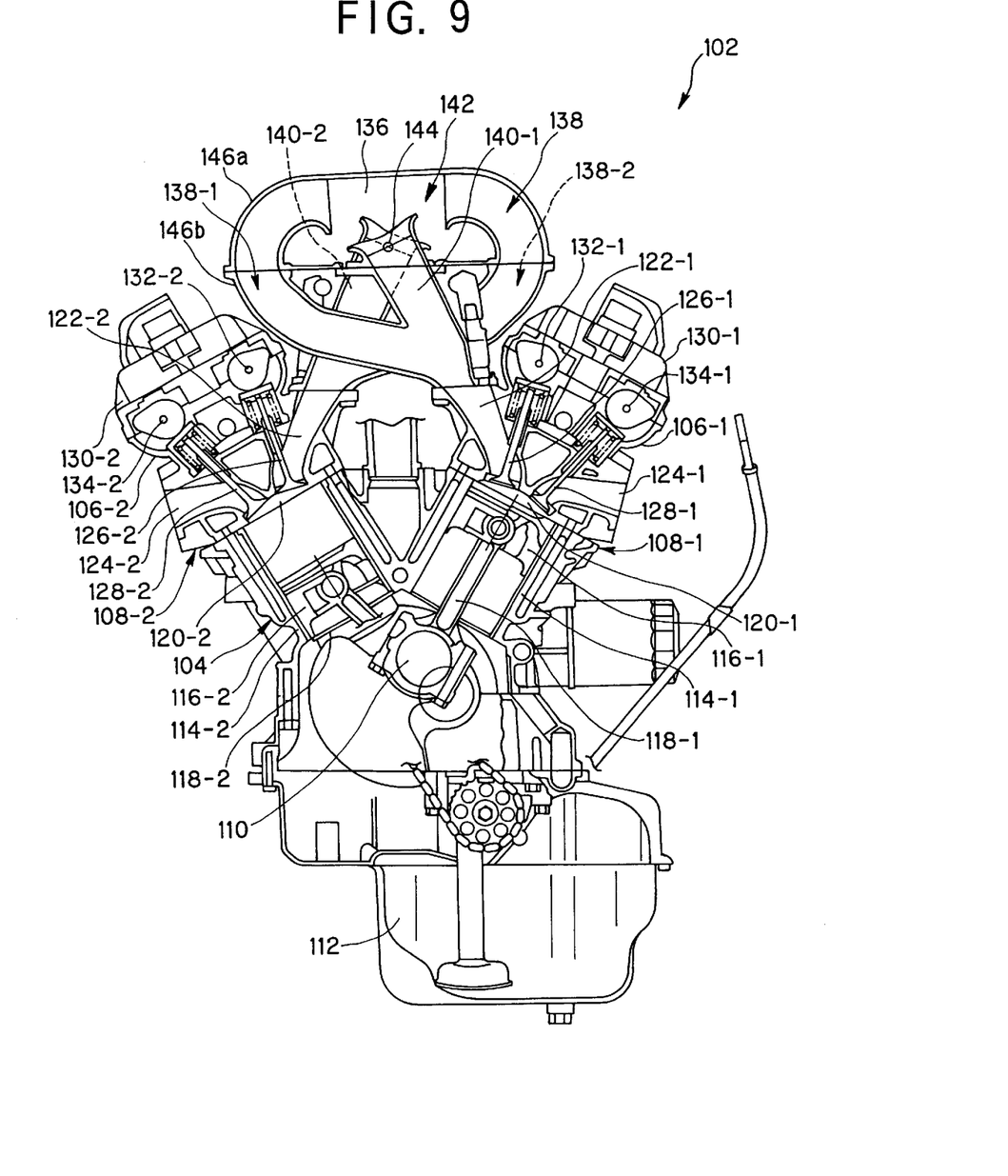
FIG. 9 is a schematic cross-sectional front view of the intake system of the V-type engine shown in FIG. 8.
Figure 10:
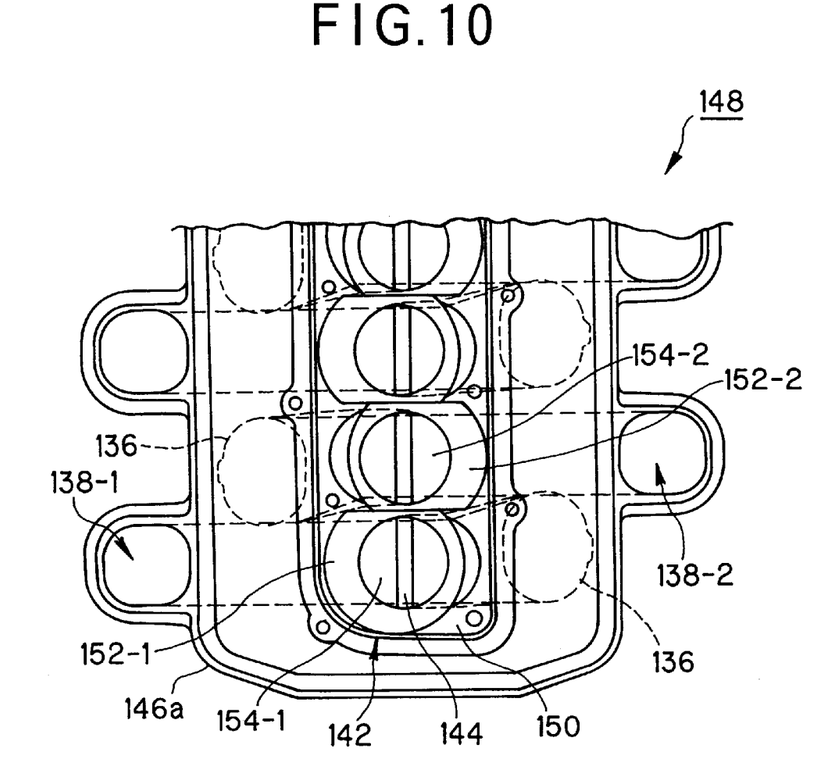
FIG. 10 is a cross-sectional view taken along line 10—10 of FIG. 8.

FIGS. 8–10 show a fourth embodiment of the present invention wherein a V-type engine 102 includes in a cylinder block 104 a first cylinder head 106-1 (see right-hand side of FIGS. 8 and 9), and a second cylinder head 106-2 (see left-hand side of FIGS. 8 and 9). The cylinder heads 106 are formed in a generally V-shape and define first and second cylinder banks 108-1, 108-2.

The cylinder block 104 has a single crankshaft 110 rotatably supported by a bearing cap (not shown) and has an oil pan 112 at a lower part thereof. The cylinder block 104 also has first and second cylinders 114-1, 114-2 along with first and second pistons 116-1, 116-2. The pistons 116 are connected to the crankshaft 110 through first and second connecting rods 118-1, 118-2.

The top surfaces of the pistons 116 as positioned within the cylinder blocks 104, and the bottom surfaces of the cylinder heads 106 define first and second combustion chambers 120-1, 120-2 which are positioned toward the first and second cylinder heads 106-1, 106-2 respectively.

In this case, the V-type engine 102 has, for example, eight cylinders. The engine 102 has four first chambers 120-1 on one side of the cylinder head and the other four second chambers 120-2 on the other side thereof. It is noted that a V-type engine having six cylinders can also be applied to the present invention.

As shown in FIGS. 8 and 9, the first cylinder head 106-1 includes a first intake port 122-1 and a first exhaust port 124-1. Also, the second cylinder head 106-2 includes a second intake port 122-2 and a second exhaust port 124-2. Incidentally, a plurality of intake ports and exhaust ports can be provided for each single cylinder if desired.

A first intake valve 126-1 opens and closes the downstream end of the first intake port 122-1. An exhaust valve 128-1 opens and closes the upstream end of the first exhaust port 124-1. Similarly, a second intake valve 126-2 opens and closes the downstream end of the second intake port 122-2. An exhaust valve 128-2 opens and closes the upstream end of the second exhaust port 124-2.

Furthermore, a first camshaft 132-1 for the intake valve and a first camshaft 134-1 for the exhaust valve are disposed within a first head cover 130-1 of the first cylinder head 106-1. Similarly, a second camshaft 132-2 for the intake valve and a second camshaft 134-2 for the exhaust valve are disposed within a second head cover 130-2 of the second cylinder head 106-2.

A single surge tank 136 is disposed above and between the first and second cylinder banks 108-1, 108-2. Intake passages 138 branch from the sides of the surge tank 136 and intersect (i.e. cross) below the tank 136 and each connects to a respective one of the cylinder banks 108-1, 108-2.

First and second intake passages 138-1, 138-2 which connect to the cylinder banks 108-1, 108-2 respectively, are disposed in a cylinder-row direction below the surge tank 136. First and second branch passages 140-1, 140-2 which branch from the middle portions of the first and second intake passages 138-1, 138-2 respectively, are also disposed below the surge tank 136. The first and second branch passages 140-1, 140-2 have center axes C1, C2 thereof sidewardly inclined respectively toward lengthwise center axes of the cylinder banks of the V-type engine such that intersection of the center axes C1, C2 when viewed in the lengthwise direction of the cylinder banks is positioned within the surge tank 136. A valve system 142 (also referred to as "variable induction valve unit") opens and closes the branch passages 140-1, 140-2. The valve system 142 has a rotating shaft 144 thereof penetrating at the intersection of the center axes.

More specifically, the V-type engine 102 comprises an intake system part 148 including the surge tank 136 and an intake manifold 146, as shown in FIG. 8. The intake system 148 comprises an upper intake manifold member 146a, a lower intake manifold member 146b, and the valve system 142. The upper intake manifold 146a comprises the surge tank 136 and upstream portion of the intake manifold 146. The lower intake manifold 146b comprises downstream portion of the intake manifold 146 which is connected to the first and second cylinder heads 106-1, 106-2. The valve system 142 is positioned inside the upper and lower intake manifolds 146a, 146b.

A throttle body (not shown) is connected to the upstream side of the upper intake manifold 146a of the intake system part 146 through an intake pipe (not shown). The upper intake manifold 146a has first and second upper intake passages 138-1a, 138-2a for low-speed operation. The passage 138-1a of the first intake passage 138-1 branches from one side of the surge tank 136 (see lower part of FIG. 8, or left-hand side of FIG. 10) and extends downwardly. The passage 138-2a of the first intake passage 138-2 branches from the other side of the surge tank 136 (see upper part of FIG. 8, or right-hand side of FIG. 10) and extends downwardly.

The upper intake manifold 146a is connected to the upstream side of the lower intake manifold 146b of the intake system part 148. The lower intake manifold 146b includes first and second lower intake passages 138-1b, 138-2b. The passage 138-1b has an upstream end thereof connected to the first upper intake passage 138-1a and a downstream end thereof connected to the first intake port 122-1 of the first cylinder head 106-1. Similarly, the passage 138-2b has an upstream end thereof connected to the second upper intake passage 138-2a and a downstream end thereof connected to the second intake port 122-2 of the second cylinder head 106-2.

Further, the first and second branch passages 140-1, 140-2 branch from the middle portions of the first and second intake passages 138-1, 138-2, respectively. That is, the passages 140-1, 140-2 branch from the midpoint of the first and second lower intake passages 138-1b, 138-2b and have upstream ends thereof connected to the lower portions of the surge tank 136.

Then, the first and second branch passages 140-1, 140-2 have the center axes C1, C2 thereof oriented toward a center of the rotating shaft 144 of the valve system 142 which is a center axis of the cylinder banks 108. The intersection of the center axes C1, C2 is positioned inside the surge tank 136.

The valve system 142 comprises a main body 150 of a variable induction system, first and second interior passages 152-1, 152-2, the rotating shaft 144, first and second valves 154-1, 154-2, and a drive section (not shown). The main body 150 is attached to the upstream ends of the branch passages 140-1, 140-2. The first and second interior passages 152-1, 152-2 are formed within the main body 150 and connected to the branch passages 140-1, 140-2 respectively. The rotating shaft 144 is disposed within the main body 150 such that the center axes C1, C2 are penetrated by the shaft 144 at the point of intersection thereof. The first and second valves 154-1, 154-2 open and close the first and second interior passages of the main body 150. The drive section drives the rotating shaft 144.

In case the V-type engine 102 comprises eight cylinders, each four first and second intake passages 138-1, 138-2 which are connected to the first and second cylinder banks 108-1, 108-2 respectively, are disposed in a cylinder-row direction. As shown in FIG. 10, the first and second valves 154-1, 154-2 which open and close the first and second interior passages 152-1, 152-2, are disposed in an alternating position from one end to the other end of the V-type engine 102.

With regard to the above V-type engine 102, the passage which is connected to the first combustion chamber 120-1 which is disposed at one end of the first cylinder bank 108-1, is referred to as the first intake passage 138-1. Also, the passage which is connected to the second combustion chamber 120-2 which is disposed at one end of the second cylinder bank 108-2, is referred to as the second intake passage 138-2. However, the other constitution having the passages in a cylinder-row direction has the similar constitution, so that the explanation thereof is omitted.

The reference numerals 156-1, 156-2 denote first and second injectors which are connected to the downstream end of the lower intake manifold 146b of the intake system part 148. The reference numerals 158-1, 158-2 denote first and second derivative pipes which are disposed inside of the upper and lower intake manifolds 146a, 146b of the intake system part 148.

The operation of the invention will be briefly described.

When the intake system part 148 is installed to the V-type engine 102, the downstream ends of the lower intake manifold 146b are connected to the first and second cylinder heads 106-1, 106-2. The first and second intake ports 122-1, 122-2 of the cylinder heads 106-1, 106-2 are connected to the downstream ends of the first and second lower intake passages 138-1b, 138-2b, respectively.

The valve system 142 is attached to the upstream ends of the first and second branch passages 140-1, 140-2 of the lower intake manifold 146b. The upper intake manifold 146a is also attached thereto. The first and second lower intake passages 138-1b, 138-2b have upstream ends thereof connected to the downstream ends of the first and second upper intake passages 138-1a, 138-2a of the upper intake manifold 146a.

Then, the center axes C1, C2 of the first and second branch passages 140-1, 140-2 are inclined toward the center axis of the rotating shaft 144 of the valve system 142 which is the center axis of the cylinder banks of the V-type engine 102. The intersection of the center axes C1, C2 is positioned within the surge tank 136.

The first and second branch passages 140-1, 140-2 for high-speed operation are thus inclined toward the center axis of the cylinder bank which is the longitudinal center shaft of the V-type engine 102. Accordingly, bending with the first and second intake ports 122-1, 122-2 of the first and second cylinder heads 106-2 opening to the center axis of the V-bank, is prevented, causing reduction in the intake resistance so as to increase the output performance of the V-type engine 102. Also, the intersection of the first and second branch passages 140-1, 140-2 is thus positioned within the surge tank 136, so that the surge tank can be installed at a lower position. Accordingly, the height dimension of the intake system can be reduced, which is advantageous in practical use.

Further, the valve system 142 which opens and closes the first and second branch passages 140-1, 140-2 thus has the rotating shaft thereof penetrated at the point of intersection. Accordingly, the valves can be operated with one single rotating shaft 144, so that the surge tank having the valve system 142 therein can be made smaller, which can reduce the width dimension of the intake system.

The present invention is not limited to the above-mentioned embodiment, but is adaptable for various applications and variations or modifications.

For example, the above-mentioned embodiment of the present invention has a constitution wherein the branch passages 140-1, 140-2 have the center axes C1, C2 thereof inclined toward the center axis of the cylinder banks, and the intersection of the axes C1, C2 is positioned within the surge tank 136 toward the upper manifold 136a, and the intersection thereof is penetrated by the rotating shaft 144 of the valve system 142. However, as a special constitution, the rotating shaft of the valve system may be positioned where the upper and lower intake manifolds 146a, 146b of the intake system 148 abut with one another.

Figure 11:
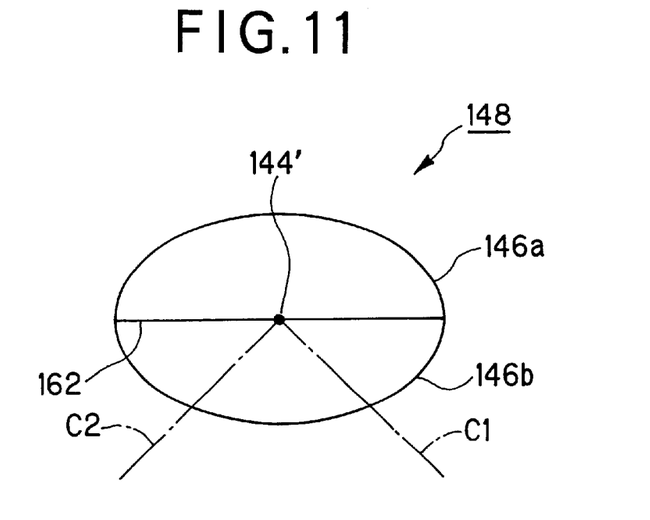
FIG. 11 is a schematic view of the intake system showing a fifth embodiment of the invention.

That is, as shown by dotted and dashed lines in FIG. 11, the center axes C1, C2 of the branch passages are inclined toward the center shaft of the cylinder banks of the V-type engine such that the intersection of the center axes C1, C2 can be positioned at the abutting portion 162. The rotating shaft 144' of the valve system can thus be positioned where the upper and lower intake manifolds 146a, 146b of the intake system 148 abut with one another, so that the manufacture can be made easier and installation of the shaft 144' of the valve system can be improved, which is advantageous from a practical point of view.

As amplified in the above-mentioned description, the present invention provides an intake system of a V-type engine having a surge tank disposed above and between first and second cylinder banks of the V-type engine, and intake passages branching from sides of the surge tank and each intersecting below the surge tank to connect to each the cylinder bank, comprising: first and second intake passages connected to the first and second cylinder banks respectively, and disposed below the surge tank in a cylinder-row direction; first and second branch passages branching from middle portions of the first and second intake passages respectively, and connected to a lower part of the surge tank, the first and second branch passage having center axes thereof inclined toward a center axis of the cylinder banks of the V-type engine, the two center axes intersecting within the surge tank; and a valve system to open and close the first and second branch passages, the valve system having a rotating shaft thereof penetrating at an intersection of the two center axes. According to the present invention, the first and second branch passages for high speed operation are thus inclined toward the center axis between the cylinder banks which is a longitudinal center axis of the V-type engine. Accordingly, bending in the intake ports of the first and second cylinder heads having openings toward the center axis of the V-bank is prevented, so that the resistance of intake can be reduced to increase the output of the V-type engine. Also, an intersection of the first and second branch passages is positioned within the surge tank, so that the surge tank can be disposed at a lower position, which can reduce height dimension of the intake system, which is advantageous in practical use. Furthermore, the intersecting part can be penetrated by one single rotating shaft of the valve system for opening and closing of the first and second branch passages. Thereby, the surge tank having the valve system built-in can be miniaturized, which can reduce width dimension of the intake system.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. An intake system of a V-type engine, comprising;
   a single surge tank extending in a cylinder-row direction above a space between first and second cylinder banks of the V-type engine, said surge tank having first and second oppositely facing sides positioned adjacent said first and second cylinder banks respectively, and further having upper wall and lower walls, and defining therein a single tank passage which extends in the cylinder-row direction;
   a first intake pipe of an intake manifold having a first end thereof connected to said second side of said surge tank adjacent said second cylinder bank for communication with said tank passage, and a second intake pipe of the intake manifold having a first end thereof connected to said first side of said surge tank adjacent said first cylinder bank for communication with said tank passage, said first and second intake pipes adjacent said first ends thereof having end portions which are disposed on opposed sides of said surge tank and which are inversely bent and turned in the vicinities of said second and first cylinder banks respectively and which have intermediate portions thereof crossing below said surge tank, said first and second intake pipes having second ends thereof connected to said first and second cylinder banks respectively, said first and second intake pipes which are connected to said first and second cylinder banks respectively being arranged in an alternating position in the cylinder-row direction;

first and second branch pipes having upper ends thereof inserted upwardly into said surge tank for connection within said tank passage and lower ends thereof connected to adjacent respective said second ends of said first and second intake pipes; and variable intake members to open and close first and second branch passages of said first and second branch pipes respectively, said variable intake members being disposed at said upper ends of said first and second branch pipes generally within said surge tank.

2. An intake system of the V-type engine according to claim 1, wherein a center longitudinally-extending axis of said cylinder banks of said V-type engine is generated in the cylinder-row direction between said cylinder banks, and horizontally disposed within said surge tank;

a valve shaft is disposed coaxial with said center longitudinally-extending axis, and supported by said branch pipes;

said variable intake members are supported on said valve shaft;

said first and second branch pipes having first and second linear longitudinal axes, respectively, extending from said lower end upwardly to said variable intake members; and said first and second linear longitudinal axes incline towards each other and transversely intersect with said valve shaft.

3. An intake system of a V-type engine comprising a surge tank extending in a cylinder-row direction above a space between first and second cylinder banks of the V-type engine;

a first intake pipe of an intake manifold having one end thereof connected to a second side of said surge tank which faces said second cylinder bank, and a second intake pipe of the intake manifold having one end thereof connected to a first side of said surge tank which faces said first cylinder bank, said first and second intake pipes having one ends thereof bent and turned in the vicinities of said second and first cylinder banks respectively and having middle portions thereof crossing below said surge tank and having the other ends thereof connected to said first and second cylinder banks respectively, said first and second intake pipes which are connected to said first and second cylinder banks respectively being arranged in an alternating position in the cylinder-row direction;

first and second branch pipes having one ends thereof inserted into said surge tank and the other ends thereof connected to adjacent respective other ends of said first and second intake pipes;

variable intake members to open and close first and second branch passages of said first and second branch pipes respectively, said variable intake members being disposed at one ends of said first and second branch pipes which are inserted into said surge tank;

said intake pipes and said branch pipes being divided into an upper block member toward said surge tank and a lower block member toward said cylinder banks by a dividing surface at substantially the same level as a lower part of said surge tank;

said upper block member defining first and second intake pipe parts, and first and second upper branch pipe parts;

said lower block member defining first and second lower intake pipe parts, and first and second lower branch pipe parts;

said upper and lower block members having respective upper and lower surfaces defining said dividing surface; and one ends of said upper branch pipe parts being disposed above said dividing surface and having said variable intake elements therein.

4. An intake system of a V-type engine according to claim 3, wherein said upper divided surface of said upper block member includes an opening into which said upper branch pipe parts having said variable intake elements therein are inserted so as to be positioned within said surge tank; and said upper divided surface surrounding said opening includes seal parts to seal between said lower divided surfaces around said lower branch pipe parts.

5. An intake system of a V-type engine, comprising:

a single surge tank disposed above and between first and second cylinder banks of said V-type engine, said surge tank having first and second outermost opposite sides;

first and second intake passages defined by respective first and second intake pipes branching from said second and first outermost opposite sides, respectively, said first intake pipe having a first end opening inwardly and toward said first opposed side of said surge tank, said second intake pipe having a first end opening inwardly and toward said second opposed side of said surge tank, said intake passages adjacent said first ends having regions inversely bent in the vicinity of the respective cylinder banks and crossing below said surge tank, said first and second intake passages having other ends thereof connected to said first and second cylinder banks respectively;

first and second branch passages branching from said first and second intake passages respectively and connected to a lower part of said surge tank, said first and second branch passages protruding upwardly through a bottom of said surge tank to upper ends of said branch passages, said upper ends disposed within said surge tank and between said intake pipes, said first and second branch passages having lower ends connected to said first and second intake passages adjacent said first and second cylinder banks, respectively, said first and second branch passage having longitudinal axes thereof inclined toward a center longitudinally-extending axis generated in the cylinder-row direction between said cylinder banks and disposed within said surge tank, said branch passage longitudinal axes transversely intersecting with said center longitudinally-extending axis; and a valve system to open and close said first and second branch passages, said valve system having a rotating shaft thereof disposed substantially coaxial with said center longitudinally-extending axis.

6. An intake system according to claim 5, wherein said valve system includes a swingable valve member associated with the said upper end of each said branch passage, each said valve member being coupled to said rotating shaft.

7. An intake system of a V-type engine comprising:

a single surge tank disposed above and between first and second cylinder banks of the V-type engine;

intake passages branching from sides of said surge tank and having portions bent inversely and crossing each other below the surge tank to connect to said cylinder banks;

first and second said intake passages connecting to intake ports of said first and second cylinder banks respectively and disposed below said surge tank in a cylinder-row direction;

a tank passage formed in said surge tank between the bent portions of said first and second intake passages;

first and second branch passages branching from said first and second intake passages respectively so as to connect to said tank passage;

said branch passages being formed in a straight shape and generally aligned with a respective intake port;

said first and second branch passages having longitudinal center axes which are inclined toward a center longitudinally-extending axis defined between said cylinder banks and which intersect within said tank passage when viewed in the longitudinal direction of the engine banks; and a valve system to open and close one ends of said first and second branch passages, including rotating shaft extending along the intersection of said first and second branch passage longitudinal axes.

* * * * *